US005744034A

United States Patent [19]

Clapham et al.

[11] Patent Number: 5,744,034

[45] Date of Patent: Apr. 28, 1998

[54] HYDRAULIC CIRCUIT

[75] Inventors: William Stephen Clapham; John Joseph Warren, both of Sheffield, England

[73] Assignee: Hydra Tools International PLC, Sheffield, England

[21] Appl. No.: 649,198

[22] Filed: May 17, 1996

[30] Foreign Application Priority Data

Jun. 9, 1995 [GB] United Kingdom .................... 9511738

[51] Int. Cl.[6] ............................ B01D 29/62; B01D 29/94; B01D 35/157

[52] U.S. Cl. ............................ 210/411; 210/98; 210/108; 210/134; 210/136; 210/427

[58] Field of Search .............................. 210/98, 106, 108, 210/134, 135, 136, 138, 167, 411, 427

[56] References Cited

U.S. PATENT DOCUMENTS 3,478,883 11/1969 Deluca .
3,907,686 9/1975 Fletcher .
4,469,594 9/1984 Poetter .
4,581,135 4/1986 Gerulis .
4,645,591 2/1987 Gerulis .
4,812,230 3/1989 Gerulis .
4,897,186 1/1990 Gerulis .

FOREIGN PATENT DOCUMENTS

0121105A1 10/1984 European Pat. Off. .
2150153 7/1995 United Kingdom .

*Primary Examiner*—Thomas M. Lithgow
*Attorney, Agent, or Firm*—Trexler, Bushnell, Giangiorgi & Blackstone, Ltd.

[57] ABSTRACT

A hydraulic circuit includes a fluid pressure inlet line (1); a fluid pressure delivery line (2); and a filter unit (FU) interposed between the inlet line (1) and the delivery line (2), with the circuit incorporating an automatic back flushing facility. The latter comprises a valve arrangement A, B, C, D, capable of temporarily preventing initial flow of fluid through the filter unit (FU) in a delivery direction, causing reverse fluid flow through the filter unit (FU) in a back flushing direction, for a predetermined period, with the flushing sequence initiated by the valve arrangement sensing a flow of fluid, at a predetermined pressure, and after the predetermined period, causing fluid flow in the normal delivery direction.

3 Claims, 3 Drawing Sheets

HYDRAULIC CIRCUIT

FIELD OF THE INVENTION

This invention relates to a hydraulic circuit incorporating an automatic back flushing facility for a filter unit within the circuit.

DESCRIPTION OF PRIOR ART

In hydraulic circuits delivering pressurised hydraulic fluid to consuming units such as hydraulic rams (whether employing water, a water/oil emulsion or oil as the hydraulic fluid) non-contamination of the fluid by debris cannot be guaranteed, and consequently the circuit must incorporate at least one filter in order to protect the circuit and in particular the valves etc., incorporated in the circuit from contamination and/or malfunction.

In use however, debris builds up on the filter unit and eventually requires removal, if the fluid flow rate through the filter unit is not to be impaired. In a first known system, debris removal has required intervention of an operator to initiate a so-called back flushing sequence to cause fluid flow temporarily in the reverse direction through the filter unit and to exit this contaminated flushing fluid, and with it the debris, from the system. Apart from relying on the vagaries of manual intervention, the relevant equipment to initiate back flushing must be positioned at a location accessible to the operator. In a second known system, an automatic back flushing facility is provided which obviates the need for operator intervention, but has relied upon a fluid pressure difference (indicating clogging of the filter) initiating the back flushing sequence, one consequence of which is interruption of fluid supply to the circuit, at an unknown time with attendant and disadvantageous starvation of supply to consuming unit(s) intended to be supplied via the circuit.

OBJECTIVE

A basic object of the present invention is to provide a hydraulic circuit with an improved automatic back flushing facility.

SUMMARY OF THE INVENTION

According to the present invention there is provided a hydraulic circuit including a fluid pressure inlet line; a fluid pressure delivery line; and a filter unit interposed between the inlet line and the delivery line, with the circuit incorporating an automatic back flushing facility comprising a valve arrangement capable of temporarily preventing flow of fluid through the filter unit in a delivery direction, and causing reverse fluid flow through the filter unit in a back flushing direction, wherein the back flushing is initiated by the valve arrangement sensing an initial flow of fluid at a predetermined pressure, and, after the predetermined period of time, causing fluid flow in the normal, delivery direction.

Thus, in contrast to prior automatic back flushing systems, the present invention provides for the automatic back flushing sequence to be initiated upon fluid flow at the predetermined pressure, first occurring, e.g. upon opening of a shut off valve or start-up of a pump, thus ensuring the non-interruption of fluid supply to the hydraulic circuit, and to consuming unit(s) supplied by the circuit, once supply has commenced.

In detail the back flushing facility may include:

(i) a back flush timing valve (A) located upstream of the filter unit (FU);

(ii) a first, pilot-operable, non-return valve (C) located downstream of the timing valve (A);

(iii) a second, pilot-operable, non-return valve (B) located downstream of the filter unit (F);

(iv) a line from the timing valve (A) to the filter unit (F);

(v) a line from the filter unit (F) to atmosphere/tank;

(vi) a third, pilot-operable, non-return valve (D) located in the line from the filter unit (F) to atmosphere/tank;

(vii) a by-pass line upstream of the timing valve (A) to convey fluid at mains pressure to a throttling device to create pilot pressure and gradual displacement of the timing valve (A) from an open position to a closed position;

(viii) a pilot gallery associated with the throttling device; and (ix) pilot lines from the gallery to the first, second and third non-return valves (C), (B) and (D) to change their condition upon pilot pressure being present.

DETAILED DESCRIPTION OF THE DRAWINGS

Figure 3:
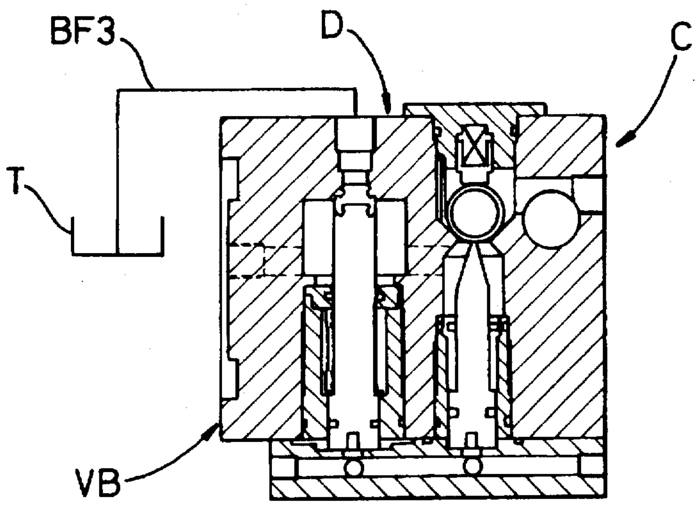
FIGS. 3, 4 and 5 are detailed views of the valves and filter unit.
Figure 4:
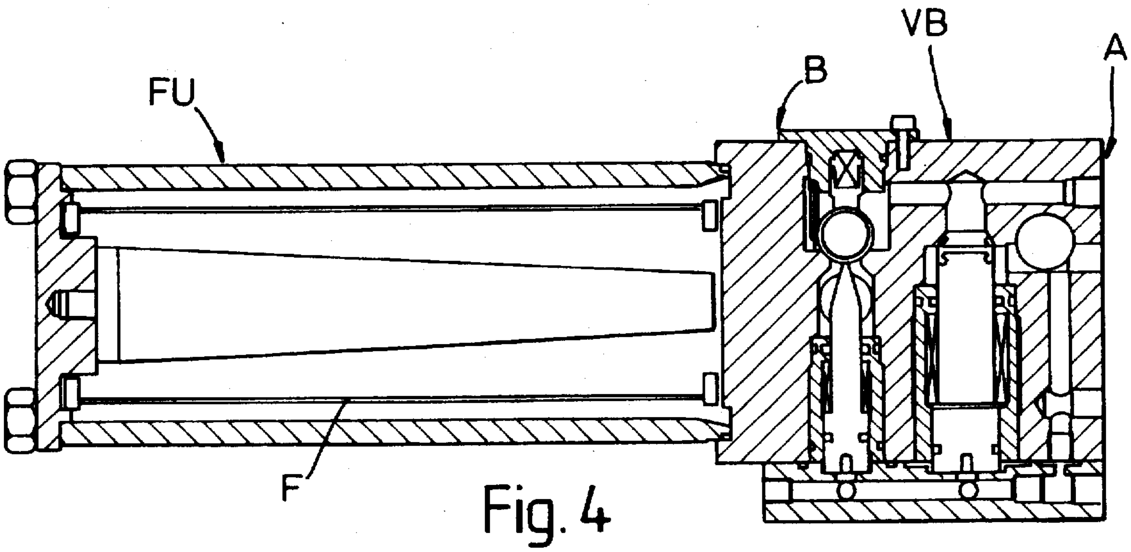
Figure 5:
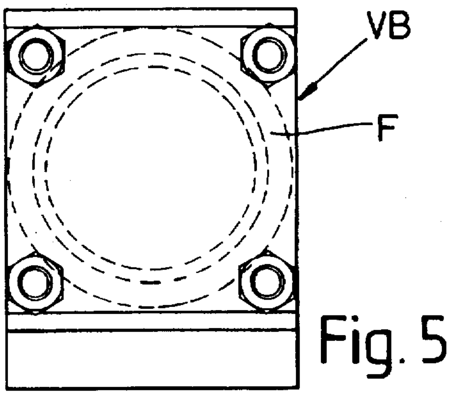

A valve block VB (FIGS. 2–4) incorporates four control valves being a backflush timing valve (A), and three pilot operated, non-return valves, (B), (C) and (D).

Each of the valves is designed to operate within a specific sequence, the order of the sequence being determined by pilot pressure settings.

In the non-working mode, i.e. with no supply of pressure fluid, the valves are in the following state:

valve (A)—spring assisted open to valve (B) and normal filter unit outlet.

valve (B)—spring assisted closed.

valve (C)—spring assisted closed.

valve (D)—spring assisted open.

The circuit has a supply line 1 connected to a pump (not shown) and a delivery line 2 for delivery of pressure fluid to consuming units (not shown). Between 1 and 2, main fluid flow is via line M1 to valve (A); then via line M2 to valve (C); then via line M3 to filter unit FU housing a filter F; then via line M4 to valve (B); and then, beyond valve (B) into delivery line 2.

However, in accordance with the invention, before this main fluid flow can commence, a black flushing sequence is inititiated by the valve (A) sensing fluid flow, at a predetermined pressure, from a main and manually, or remotely, operable valve MV.

Figure 1:
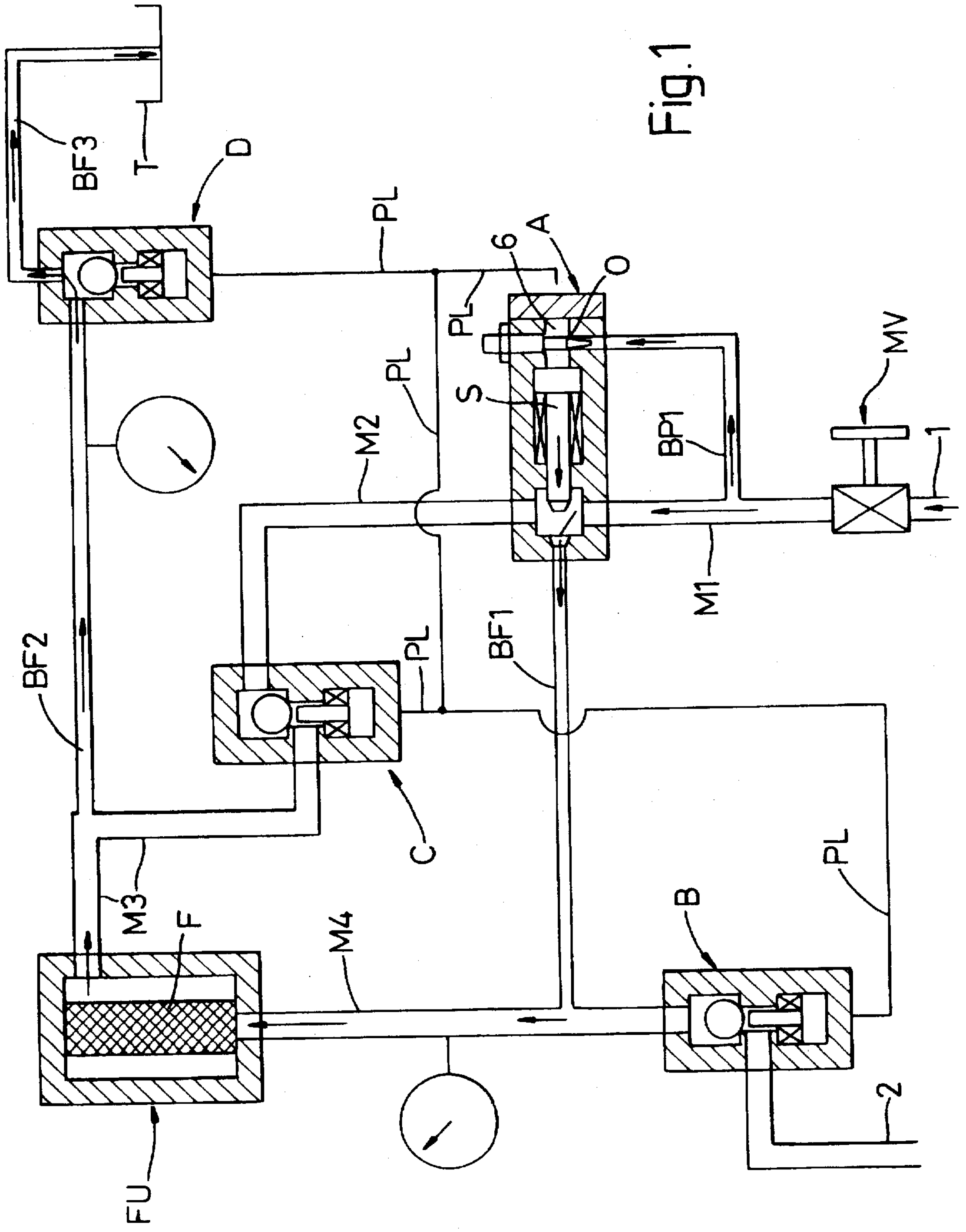
FIG. 1 is a diagrammatic flow diagram with arrows showing fluid flow in the backflushing mode.
Figure 2:
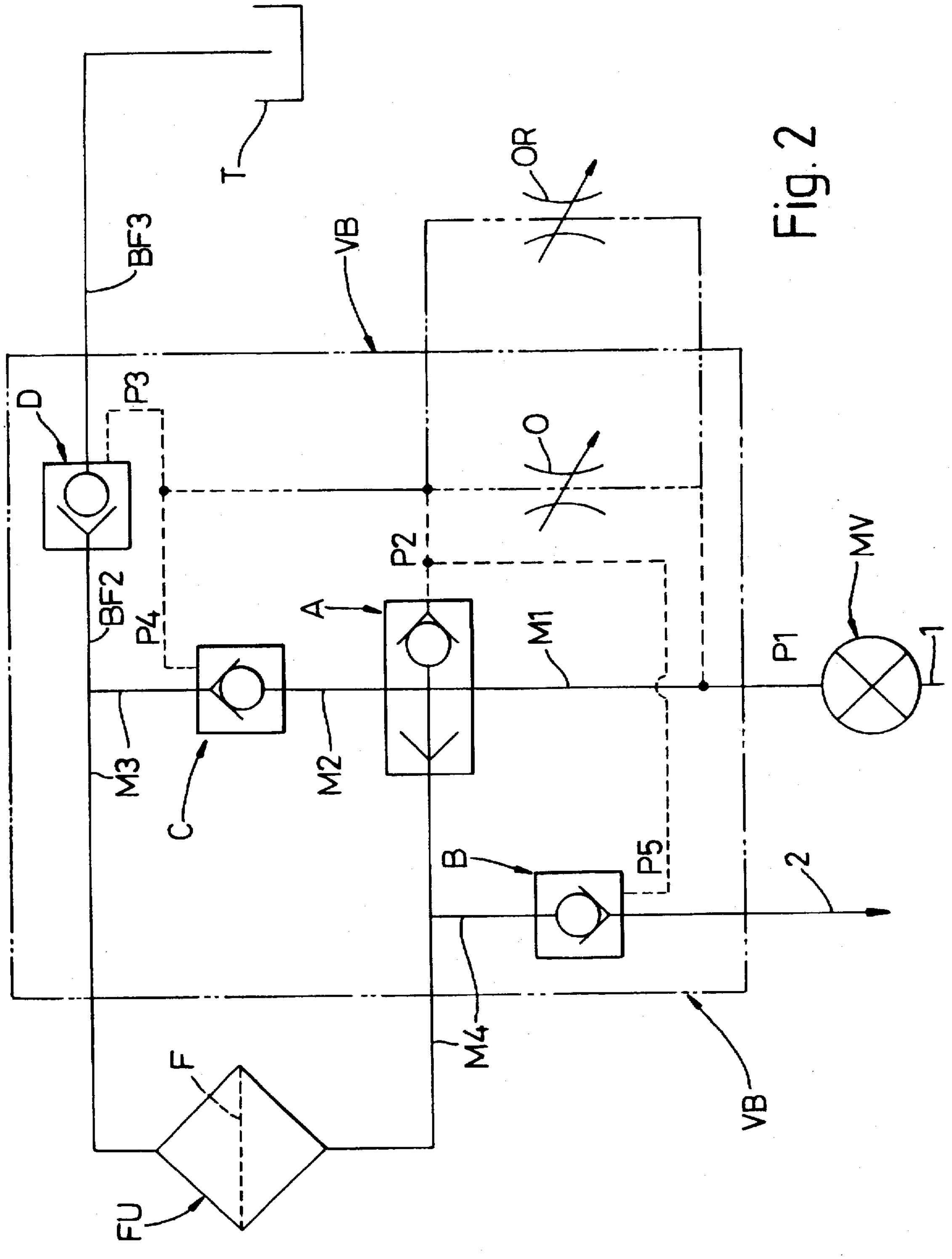
FIG. 2 is a circuit drawing.

In detail, upon opening the main water valve (MV), flow of pressurised fluid at pressure P1 is allowed through open valve (A). The latter has a back-flushing line BF1 extending in fluid flow communication to line M4 giving 'backflushing' flow, in the direction of the arrows, and in the reverse direction to normal flow and via back-flushing line BF2 which is in fluid communication with line M3 to valve (D) and thence via line BF3 to atmosphere/tank T, with valves (B) and (C) remaining in the closed state. A by-pass line BP1 is in fluid flow communication with line M1 so that, fluid flow simultaneously occurs through the orifice (0) of valve (A) (which may be adjustable and locally situated as indicated in FIG. 1 and/or remotely located at OR as indicated in FIG. 2), to the pilot side of valve (A). This throttled flow and pressure causes the spool (S) of valve (A) to move as indicated by the arrow in FIG. 1 and eventually close off the 'backflushing' flow via line BF1 to filter unit FU.

The required closing pressure P2 of valve (A), will be lower than the main system pressure P1.

Pilot pressure feeds for valves (B), (C) and (D) are via pilot line network PL taken from the pilot gallery 6 of valve (A). When valve (A) has attained its closed position the pilot pressure downstream of orifice (0), will progressively increase to equate to the system pressure P1. As pilot pressures increases, valve (D) is first closed by pressure P3. Valve (C) next opens due to pressure P4 and then valve (B) at pilot pressure P5, when flow will commence through valve (C), the filter unit FU, valve (B) and then to the outlet port of the valve block VB. Thus, the sequence of operation would be as follows:

(i) valve (A) closes (ii) valve (D) closes (iii) valve (C) opens (iv) valve (B) opens whereupon flow commences to the main or service circuit.

Upon closing valve MV, pressure within the system will decay allowing all valves to return, by spring assistance, to their start positions.

What we claim is:

1. A hydraulic circuit comprising a fluid pressure inlet line; a fluid pressure delivery line; and a filter unit interposed between said inlet line and said delivery line, with said circuit incorporating an automatic back flushing facility comprising valve arrangement means for temporarily preventing flow of fluid through said filter unit in a delivery direction, and for causing reverse fluid flow through the filter unit in a back flushing direction, wherein said back flushing is initiated by said valve arrangement means sensing an initial flow of fluid, at a predetermined pressure, and, after a predetermined period of time, causing fluid flow in the normal, delivery direction, said back-flushing facility comprising;

(i) a back flush timing valve (A) located upstream of said filter unit (FU);

(ii) a first, pilot-operable, non-return valve (C) located downstream of said timing valve (A);

(iii) a line (M2) between said flush timing valve (A) and said first non-return valve (C);

(iv) a line (M3) between said first non-return valve (C) and said filter unit (FU);

(v) a second, pilot-operable, non-return valve (B) located downstream of said filter unit (FU);

(vi) a back-flushing line from said timing valve (A) to said filter unit (FU);

(vii) a line from said filter unit (FU) to atmosphere/tank;

(viii) a third, pilot-operable, non-return valve (D) located in said line from said filter unit (FU) to atmosphere/tank;

(ix) a by-pass line upstream of said timing valve (A) to convey fluid at mains pressure to a throttling device to create pilot pressure and gradual displacement of said timing valve (A) from an open position to a closed position;

(x) a pilot gallery associated with said throttling device; and (xi) pilot lines from said gallery to said first, second and third non-return valves (C), (B) and (D) to change their condition upon pilot pressure being present.

2. A hydraulic circuit comprising a fluid pressure inlet line; a fluid pressure delivery line; and a filter unit interposed between said inlet line and said delivery line, with said circuit incorporating an automatic back flushing facility comprising a valve arrangement means for temporarily preventing flow of fluid through said filter unit in a delivery direction, and for causing reverse fluid flow through the filter unit in a back flushing direction, wherein said back flushing is initiated by said valve arrangement means sensing an initial flow of fluid, at a predetermined pressure, and, after a predetermined period of time, causing fluid flow in the normal, delivery direction, said valve arrangement means comprising a timing valve and a plurality of associated pilot valves, means for changing the state of the pilot valves, sequentially, by fluid flow from said timing valve to said pilot valves.

3. A hydraulic circuit comprising a fluid pressure inlet line; a fluid pressure delivery line; and a filter unit interposed between said inlet line and said delivery line, with said circuit incorporating an automatic back flushing facility comprising a valve arrangement means for temporarily preventing flow of fluid through said filter unit in a delivery direction, and for causing reverse fluid flow through the filter unit in a back flushing direction, wherein said back flushing is initiated by said valve arrangement means sensing an initial flow of fluid, at a predetermined pressure, and, after a predetermined period of time, causing fluid flow in the normal, delivery direction, said valve arrangement means comprising a timing valve and a plurality of associated pilot valves, said timing valve including means for starving said pilot valves of pilot pressure, until such time as said timing valve has completed its timing period, which period commences upon mains pressure being made available to said timing valve.

* * * * *